United States Patent
He

(10) Patent No.: US 12,283,757 B2
(45) Date of Patent: Apr. 22, 2025

(54) RET ASSEMBLIES PROVIDING SYNCHRONIZED PHASE SHIFT OF PHASE SHIFTERS FOR BASE STATION ANTENNAS

(71) Applicant: Outdoor Wireless Networks LLC, Claremont, NC (US)

(72) Inventor: Fan He, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 0 days.

(21) Appl. No.: 18/729,239

(22) PCT Filed: Apr. 27, 2023

(86) PCT No.: PCT/US2023/020102
§ 371 (c)(1),
(2) Date: Jul. 16, 2024

(87) PCT Pub. No.: WO2023/235081
PCT Pub. Date: Dec. 7, 2023

(65) Prior Publication Data
US 2025/0007153 A1    Jan. 2, 2025

(30) Foreign Application Priority Data

May 30, 2022    (CN) .......................... 202210595802.6

(51) Int. Cl.
*H01Q 3/32*    (2006.01)
*H01P 1/18*    (2006.01)
(Continued)

(52) U.S. Cl.
CPC ................. *H01Q 3/16* (2013.01); *H01Q 3/32* (2013.01); *H01Q 21/062* (2013.01); *H01Q 21/26* (2013.01)

(58) Field of Classification Search
CPC .. H01Q 3/00; H01Q 3/32; H01Q 3/36; H01Q 3/16; H01Q 21/06; H01Q 21/062; H01Q 21/08; H01Q 21/26
See application file for complete search history.

(56) References Cited

U.S. PATENT DOCUMENTS 5,302,959 A * 4/1994 Harrington .............. H01Q 3/36
                                                              342/372
7,907,096 B2   3/2011 Timofeev et al.
(Continued)

FOREIGN PATENT DOCUMENTS

WO    2019236203 A2    12/2019
WO    2020072880 A1    4/2020
(Continued)

OTHER PUBLICATIONS

International Search Report and the Written Opinion of the International Searching Authority corresponding to International Patent Application No. PCT/US2023/020102 (11 pages) (mailed Jul. 21, 2023).

*Primary Examiner* — Tho G Phan
(74) *Attorney, Agent, or Firm* — Myers Bigel, P.A.

(57) ABSTRACT

RET assemblies suitable for base station antennas are provided that include a gear plate with a plurality of arms that extend in a longitudinally upward direction and a plurality of arms that extend in a longitudinally downward direction. The gear plate is coupled to a motor and lead screw that drive the gear plate, which in turn, rotates gears coupled to the gear plate. The gears rotate wipers of phase shifters in synchronization.

18 Claims, 17 Drawing Sheets

(51) Int. Cl.
  *H01Q 3/16*    (2006.01)
  *H01Q 3/36*    (2006.01)
  *H01Q 21/06*   (2006.01)
  *H01Q 21/26*   (2006.01)

(56) References Cited

U.S. PATENT DOCUMENTS

| | | | |
|---|---|---|---|
| 10,403,974 B2 * | 9/2019 | Moon | H01Q 3/02 |
| 10,615,488 B2 * | 4/2020 | Liu | H01Q 1/246 |
| 10,854,967 B2 * | 12/2020 | Zimmerman | H01Q 1/246 |
| 11,081,789 B2 | 8/2021 | Ding et al. | |
| 11,289,800 B2 * | 3/2022 | Udagave | H01Q 21/26 |
| 11,374,316 B2 * | 6/2022 | Xu | H01Q 3/2688 |
| 11,482,774 B2 | 10/2022 | Hou et al. | |
| 11,688,944 B2 * | 6/2023 | Singh | H01Q 1/422 |
| | | | 343/702 |
| 11,855,351 B2 * | 12/2023 | Li | H01Q 1/246 |
| 2005/0046514 A1 | 3/2005 | Janoschka | |
| 2017/0078892 A1 | 3/2017 | Shen et al. | |
| 2017/0373379 A1 | 12/2017 | Schmutzler | |
| 2019/0027825 A1 | 1/2019 | Fang et al. | |
| 2020/0044321 A1 | 2/2020 | Al et al. | |
| 2021/0159589 A1 | 5/2021 | Everest et al. | |

FOREIGN PATENT DOCUMENTS

| | | | |
|---|---|---|---|
| WO | 2021118738 A1 | 6/2021 | |
| WO | 2021195040 A2 | 9/2021 | |

* cited by examiner

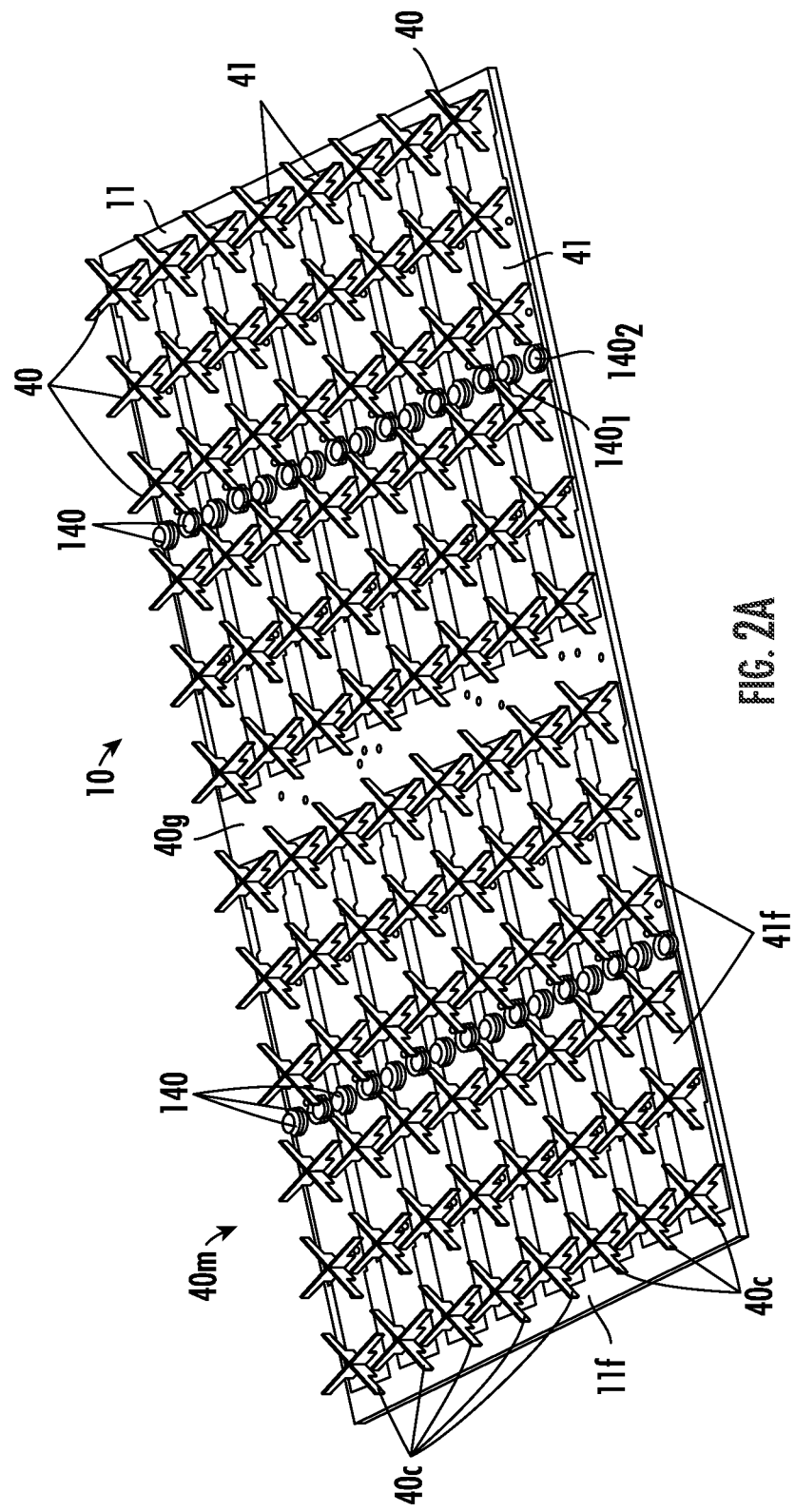

RET ASSEMBLIES PROVIDING SYNCHRONIZED PHASE SHIFT OF PHASE SHIFTERS FOR BASE STATION ANTENNAS

BACKGROUND

The present invention generally relates to radio communications and, more particularly, to base station antennas for cellular communications systems.

Cellular communications systems are well known in the art. In a cellular communications system, a geographic area is divided into a series of regions or "cells" that are served by respective macrocell base stations. Each macrocell base station may include one or more base station antennas that are configured to provide two-way radio frequency ("RF") communications with subscribers that are within the cell served by the base station. In many cases, each base station is divided into "sectors." In one common configuration, a hexagonally-shaped cell is divided into three 120° sectors in the azimuth plane, and each sector is served by one or more macrocell base station antennas that have an azimuth Half Power Beamwidth (HPBW) of approximately 65°. So-called small cell base stations may be used to provide service in high-traffic areas within portions of a cell. Typically, the base station antennas are mounted on a tower or other raised structure, with the radiation patterns that are generated by the base station antennas directed outwardly.

Base station antennas for wireless communication systems are used to transmit RF signals to, and receive RF signals from, fixed and mobile users of a cellular communications service. Base station antennas often include a linear array or a two-dimensional array of radiating elements such as dipole, or crossed dipole, radiating elements. To change the down tilt angle of the radiation pattern or "antenna beam" that is generated by an array of radiating elements, a phase taper may be applied to the sub-components of the RF signal that are fed to the radiating elements of the array. Such a phase taper may be applied by adjusting the settings on an adjustable phase shifter that is positioned along an RF transmission path between a radio and the individual radiating elements of the base station antenna.

One known type of phase shifter is an electromechanical rotating "wiper" arc phase shifter that includes a main Printed Circuit Board (PCB) and a "wiper" PCB that may be rotated above the main PCB. Such a rotating wiper arc phase shifter typically divides an input RF signal that is received at the main PCB into a plurality of sub-components, and then capacitively couples at least some of these sub-components to the wiper PCB. These sub-components of the RF signal may be capacitively coupled from the wiper PCB back to the main PCB along a plurality of arc-shaped traces, where each arc has a different radius. Each end of each arc-shaped trace may be connected to a radiating element or to a sub-group of radiating elements. By physically rotating the wiper PCB above the main PCB, the location where the sub-components of the RF signal capacitively couple back to the main PCB may be changed, thereby changing the path lengths that the sub-components of the RF signal traverse when passing from a radio to the radiating elements. These changes in the path lengths result in changes in the phases of the respective sub-components of the RF signal, and because the arcs have different radii, the change in phase experienced along each path differs.

Typically, the phase taper is applied by applying positive phase shifts of various magnitudes (e.g., $+X°$, $+2X°$ and $+3X°$) to some of the sub-components of the RF signal and by applying negative phase shifts of the same magnitudes (e.g., $-X°$, $-2X°$ and $-3X°$) to additional of the sub-components of the RF signal. Thus, the above-described rotary wiper arc phase shifter may be used to apply a phase taper to the sub-components of an RF signal that are transmitted through the respective radiating elements (or sub-groups of radiating elements). Example phase shifters of this variety are discussed in U.S. Pat. No. 7,907,096 to Timofeev, the disclosure of which is hereby incorporated herein by reference in its entirety. The wiper PCB is typically moved using an actuator that includes a Direct Current (DC) motor that is connected to the wiper PCB via a mechanical linkage. These actuators are often referred to as "RET" actuators because they are used to apply the remote electronic down tilt.

For additional discussion of examples of prior art wiper phase shifters, See, U.S. Pat. No. 11,081,789, the contents of which are hereby incorporated by reference as if recited in full herein.

SUMMARY

Pursuant to embodiments of the invention, RET assemblies are provided with a gear plate with a plurality of laterally spaced apart arms providing respective gear tracks with gear teeth configured to couple to a plurality of laterally spaced apart gears on a back side of feedboard(s). The gears concurrently communicate with wipers on a front side of the feedboard(s) to thereby allow synchronized adjustment of the phase shifters (e.g., wipers of the phase shifters) in order to synchronously adjust the electronic tilt angles of the antenna beams generated by a multi-column array of radiating elements.

The RET assemblies can occupy less space and/or provide for down tilt synchronization for arrays of radiating elements of base station antennas, particularly for massive Multiple Input Multiple Output (mMIMO) antenna arrays.

Embodiments of the present invention are directed to a remote electronic tilt (RET) assembly that includes a gear plate with a plurality of arms that extend in a longitudinal direction and that are laterally spaced apart. At least some of the plurality of arms define linear gear tracks comprising gear teeth. The RET assembly also includes a plurality of gears, each of the plurality of gears rotatably coupled to one or two of the linear gear tracks; and a motor coupled to a lead screw that is coupled to the gear plate. The motor and lead screw are configured to drive the gear plate upwardly and downwardly. The RET assembly also includes a plurality of phase shifters, each phase shifter including a respective wiper that is located in front of the gear plate. Each gear is coupled to one or more of the plurality of phase shifters. The RET assembly also includes a plurality of radiating elements in front of the gear plate and coupled to the phase shifters whereby downtilt angles of antenna beams generated by respective subsets of the radiating elements are changed in response to translation of the gear plate.

The gear plate can be a single monolithic member and can be formed of a dielectric material.

The gear plate can be planar.

The RET assembly can also include a reflector between the radiating elements and the gear plate.

The RET assembly can further include a plurality of printed circuit boards. Two of the phase shifters can be implemented in each of the printed circuit boards. The radiating elements can project forwardly from the printed circuit boards.

Each phase shifter can include a respective wiper printed circuit board.

The plurality of printed circuit boards can be arranged in a plurality of columns and rows.

The gear plate can be configured with a frame portion. The plurality of arms can be arranged to have a first plurality of arms that extend longitudinally upward from the frame portion of the gear plate and to have a second plurality of arms that extend longitudinally downward from the frame portion.

The plurality of radiating elements can be provided in rows and columns. The plurality of arms can be provided as sixteen arms. The plurality of gears can be either sixteen or thirty two. The gear plate and the plurality of gears can be configured to adjust settings of the plurality of phase shifters in synchronization.

The columns can be configured as eight columns stacked above an aligned second set of another eight columns to define sixteen columns.

The RET assembly can further include a plurality guide members that can be laterally and longitudinally spaced apart and can be arranged behind the radiating elements and configured to slidably cooperate with the gear plate to provide alignment during translation. The guide members can be formed of dielectric material.

The motor can be arranged to reside outside the frame portion.

The motor can be arranged to reside within an opening in the frame portion.

The RET assembly can also include a calibration board that can reside above or below the gear plate, parallel to and/or co-planar with the reflector.

A first one of the plurality of arms can be configured with first and second laterally spaced apart linear gear tracks to define some of the gear tracks. A first one of the plurality of gears can be coupled to the first linear gear track and a second one of the plurality of gears can be coupled to the second linear gear track.

A single gear of the plurality of gears can be coupled to a corresponding single arm of the plurality of arms.

The single gear can be coupled to a rotatable driver gear that can be configured to engage gear teeth of a pair of adjacently positioned wipers positioned in front of printed circuit boards.

The plurality of wipers can be arranged in two longitudinally spaced apart rows.

Yet other embodiments are directed to a base station antenna that includes: a radome; a plurality of printed circuit boards behind the radome; a reflector behind the plurality of printed circuit boards; a plurality of radiating elements mounted to extend forwardly from the printed circuit boards; and a remote electronic tilt (RET) assembly behind the radome. The RET assembly has a gear plate coupled to a lead screw driven by a motor and a plurality of gears rotatably coupled to the gear plate. The gear plate, lead screw and motor and the plurality of gears are positioned behind the reflector. The base station antenna also includes a plurality of phase shifters in front of the gear plate, with each of the plurality of phase shifters is coupled to one or more of the plurality of gears.

The gear plate can have a frame portion. The plurality of arms can be arranged as a first plurality of arms that extend longitudinally upward from the frame portion and a second plurality of arms that extend longitudinally downward from the frame portion.

The RET assembly can be provided in an active antenna module.

Yet other aspects are directed to methods of adjusting tilt of radiating elements of a base station antenna. The methods include driving a gear plate of a remote electronic tilt (RET) assembly with a plurality of arms that extend in a longitudinal direction. The plurality of arms can define linear gear tracks. The methods also include rotating gears coupled to the gear plate in response to the driving; and concurrently adjusting a plurality of phase shifters in response to the driving and rotating.

The rotating can be carried out so that all the gears rotate in synchronization. The plurality of arms can be arranged to have a first plurality of arms that extend longitudinally upward and to have a second plurality that extend longitudinally downward.

The plurality of radiating elements can be provided in a plurality of columns. The gear plate and the plurality of gears can be configured to concurrently move wipers of the phase shifters to impart a phase progression to sub-components of a respective RF signal that are fed to corresponding ones of the plurality of radiating elements to thereby concurrently adjust the phase.

The plurality of radiating elements can project forward of a plurality of printed circuit boards that can be arranged in columns. Each printed circuit board of the plurality of printed circuit boards can have an RF transmission path thereon.

The base station antenna can have a reflector that can reside behind the radiating elements and in front of the gear plate. The radiating elements can be coupled to the phase shifters. The phase shifters can be directly or indirectly coupled to the gears.

Still other aspects are directed to a base station antenna that includes: a plurality feed boards, each feed board including a pair of phase shifters; a plurality of columns of radiating elements, each column of radiating elements mounted to extend forwardly from a respective one of the feed boards; and a remote electronic tilt (RET) assembly. The RET assembly includes a gear plate coupled to a lead screw driven by a motor and a plurality of gears rotatably coupled to the gear plate. The gear plate, lead screw and motor and the plurality of gears are positioned rearwardly of the plurality of feed boards. The RET assembly is configured so that rotation of each gear thereof is configured to change a setting of at least one of the plurality of phase shifters.

The gear plate can be a single monolithic member and can be formed of a dielectric material.

The gear plate can be planar.

The base station antenna can also include a reflector between the feed boards and the gear plate.

Each phase shifter can include a respective wiper printed circuit board positioned in front of a corresponding feed board.

The gear plate can be configured with a frame portion and a first plurality of arms that extend longitudinally upward from the frame portion of the gear plate and a second plurality of arms that extend longitudinally downward from the frame portion.

The first plurality of arms can be eight and the second plurality of arms can be eight. The plurality of gears can be either sixteen or thirty two. The gear plate and the plurality of gears can be configured to adjust settings of the pairs of phase shifters of different feed boards in synchronization.

The base station antenna can also include a plurality guide members that are laterally and longitudinally spaced apart and arranged behind the plurality of feed boards and configured to slidably cooperate with the gear plate to provide alignment during translation. The guide members are formed of dielectric material.

The motor can be arranged to reside outside the frame portion.

The motor can be arranged to reside within an opening in a frame portion.

The base station antenna can include a calibration board that can reside above or below the gear plate, parallel to and/or co-planar with the reflector.

The gear plate can have a plurality of longitudinally extending arms. A first one of the plurality of arms can be configured with first and second laterally spaced apart linear gear tracks to define some gear tracks of the gear plate. A first one of the plurality of gears can be coupled to the first linear gear track and a second one of the plurality of gears can be coupled to the second linear gear track.

A single gear of the plurality of gears can be coupled to a corresponding single arm of a plurality of arms provided by the gear plate.

A single gear of the plurality of gear can be coupled to a rotatable driver gear that is configured to engage gear teeth of a pair of adjacently positioned wipers of the phase shifters.

Still other aspects are directed to a remote electronic tilt (RET) assembly that includes: a motor having a drive shaft; a lead screw coupled to the drive shaft; a nut mounted for linear movement on the lead screw; a gear plate coupled to the nut so that linear movement of the nut results in linear movement of the gear plate; and a plurality of gears coupled to the gear plate. The gear plate includes a plurality of gear tracks. Each gear track is coupled to a respective gear of the plurality of gears and each gear of the plurality of gears is configured to couple to a wiper of at least one phase shifter.

The gear plate can be a single monolithic member and can be formed of a dielectric material.

The gear plate can be planar.

The RET assembly can also include a reflector in front of the gear plate.

The RET assembly can also include a plurality of feed boards defining at least part of respective phase shifters. Two of the phase shifters can be implemented in each of the feed boards. The radiating elements can project forwardly from the feed boards.

Each phase shifter includes a respective wiper printed circuit board coupled to a corresponding one of the feed boards The gear plate can be configured with a frame portion. The plurality of arms can be arranged to have a first plurality of arms that extend longitudinally upward from the frame portion of the gear plate and to have a second plurality of arms that extend longitudinally downward from the frame portion.

The RET assembly can further include a plurality guide members that can be laterally and longitudinally spaced apart and arranged to slidably cooperate with the gear plate to provide alignment during translation. The guide members can be formed of dielectric material.

The motor can be arranged to reside outside the frame portion

The motor can be arranged to reside within an opening in the frame portion.

The RET assembly can further include a calibration board residing above or below the gear plate.

The gear plate can have a plurality of arms. A first one of the plurality of arms can be configured with first and second laterally spaced apart linear gear tracks to define some of the gear tracks. A first one of the plurality of gears can be coupled to the first linear gear track and a second one of the plurality of gears is coupled to the second linear gear track.

A single gear of the plurality of gears can be coupled to a corresponding single arm of the plurality of arms.

The single gear can be coupled to a rotatable driver gear that is configured to engage gear teeth of a pair of adjacently positioned wipers positioned in front of printed circuit boards.

It should be noted that various aspects of the present disclosure described for one embodiment may be included in other different embodiments, even though specific description is not made for the other different embodiments. In other words, all the embodiments and/or features of any embodiment may be combined in any manner and/or combination, as long as they are not contradictory to each other.

BRIEF DESCRIPTION OF THE DRAWINGS

FIG. 21B is an enlarged, partial front, side view of the RET assembly shown in FIG. 1 according to embodiments of the present invention.

DETAILED DESCRIPTION

In the description that follows, base station antennas and the components thereof are described using terms that assume that the base station antennas are mounted for use on a tower with the longitudinal axis of the antenna extending along a vertical (or near vertical) axis and the front surface of the antenna mounted opposite the tower or other mounting structure pointing toward the coverage area for the antenna.

Figure 14:
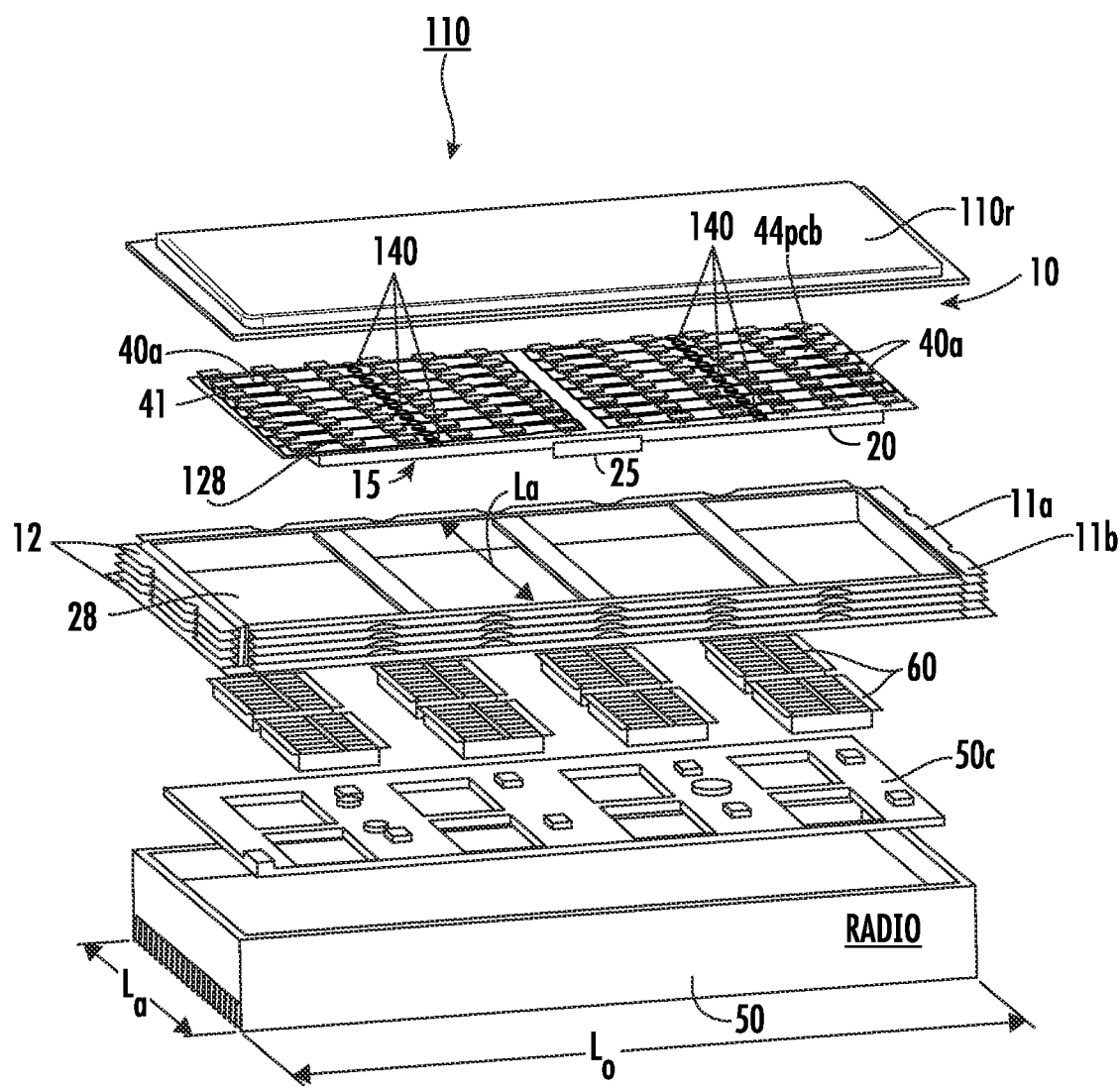
FIG. 14 is an exploded view of an example active antenna unit comprising an RET assembly according to embodiments of the present invention.

With the introduction of fifth generation ("5G") cellular technologies, base station antennas are now routinely being deployed that have active beamforming capabilities. Active beamforming refers to transmitting RF signals through a multi-column array of radiating elements in which the relative amplitudes and phases of the sub-components of an RF signal that are transmitted (or received) through the different radiating elements of the array are adjusted so that the radiation patterns that are formed by the individual radiating elements constructively combine in one or more desired directions to form narrower antenna beams that have higher gain. With active beamforming, the shape and pointing direction of the antenna beams generated by the multi-column array may, for example, be changed on a time slot-by-time slot basis of a time division duplex ("TDD") multiple access scheme. Moreover, different antenna beams can be generated simultaneously on the same frequency resource in a multi-user MIMO scenario. More sophisticated active beamforming schemes can apply different beams to different physical resource blocks that are a combination of time and frequency resources by applying the beam vector in the digital domain. Base station antennas that have active beamforming capabilities are often referred to as active antennas. When the multi-column array includes a large number of columns of radiating elements (e.g., sixteen or more), the array is often referred to as a massive MIMO array. A module that includes a multi-column array of radiating elements, RET gear systems and associated RF circuitry (and perhaps baseband circuitry) that implement an active antenna along with a radio is referred to herein as an active antenna module 110 (FIG. 14).

Embodiments of the present invention will now be discussed in greater detail with reference to the attached figures.

Referring to FIGS. 1-6, a RET assembly 10 for a base station antenna 1 is shown. The base station antenna includes a reflector 11 and a multi-column array of radiating elements 40. The radiating elements 40 are mounted on a plurality of feed boards 41f and extend forwardly from the feed boards 41f. The base station antenna 1 may include numerous other components (not shown) such as for example, a housing including a radome, coaxial cables, controllers, filters, etc.

The RET assembly 10 comprises a RET gear system 15 and a plurality of phase shifters 140. The phase shifters 140 are implemented on the feed boards 41f. In the depicted embodiment, each phase shifter is implemented as a wiper arc phase shifter, and two phase shifters $140_1$, $140_2$ are implemented on each feed board 41f. The first phase shifter $140_1$ on each feed board 41f is part of a first feed network that feeds the sub-components of a first RF signal that is to be transmitted to the respective first polarization radiators of each radiating element 40 mounted on the feed board 41f, and the second phase shifter $140_2$ on each feed board 41f is part of a second feed network that feeds the sub-components of a second RF signal that is to be transmitted to the respective second polarization radiators of each radiating element 40 mounted on the feed board 41f. A first portion of each feed board 41f serves as the main PCB of the first phase shifter $140_1$ that is included on the feed board 41f, and a second, adjacent portion of each feed board 41f serves as the main PCB of the second phase shifter $140_2$ that is included on the feed board 41f. A pair of small wiper members 140w, such as wiper PCBs, (that are typically, but not always, mounted on respective plastic wiper supports) are mounted for rotation, in response to rotation of a corresponding gear 150, in front of the respective first and second portions of the feed board 41f that form the main PCBs of the respective first and second phase shifters $140_1$, $140_2$.

Figure 4:
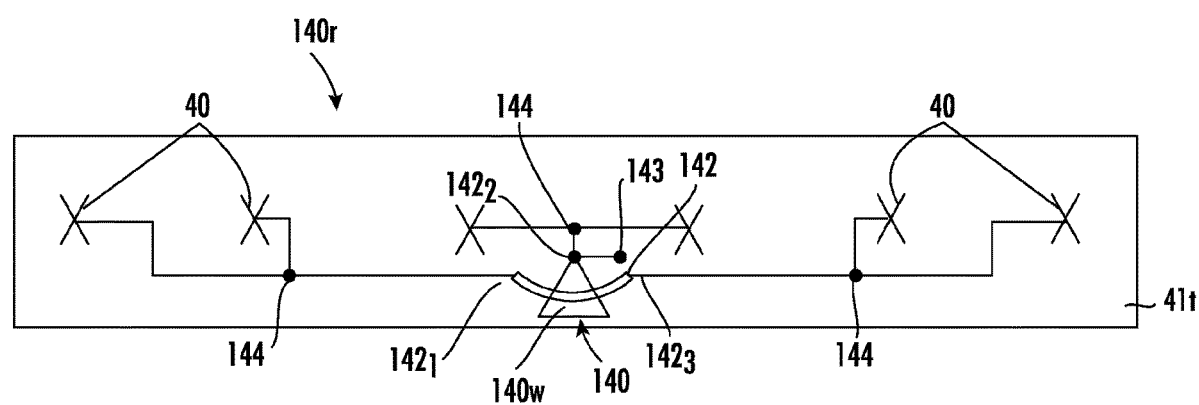
FIG. 4 is a schematic illustration of a feed board with a phase shifter according to embodiments of the present invention.

FIG. 4 illustrates an example one of the feed boards 41f in greater detail. An example one phase shifter 140 is shown for clarity as typically there are two phase shifters 140 (a pair of phase shifters) for each feed board 41f as is well known to those of skill in the art. The feed board 41f defines a primary phase shifter printed circuit board (PCB) as is also well known to those of skill in the art. Each phase shifter 140 has an RF transmission path 140r comprising an input, first through third outputs $142_1$ through $142_3$, a first level power divider 144 with a tap port 143 that goes to a second output $142_2$ of the phase shifter 140, and a wiper 140w. The wiper 140w can be configured as a smaller cooperating PCB. A single arc 142 is provided on the feed board 41f behind the wiper 140w. The first and third outputs $142_1$, $142_3$ of the phase shifter 140 are on longitudinally opposing sides of the arc 142. The first output $142_1$ is coupled to the first and second radiating elements 40 on the feed board 41f through a first second level power divider 144, the second output $142_2$ is coupled to the third and fourth radiating elements 40 through a second second level power divider 144, and the third output $142_3$ is coupled to the fifth and sixth radiating elements 40 through a third second level power divider 144. While only two of the three outputs $142_1$ through $142_3$ of the phase shifter 140 are coupled to the input thereof through the wiper 140w in the depicted embodiment, it will be appreciated that in other embodiments all of the outputs $142_1$ through $142_3$ may be coupled to the input through the wiper 140w.

Since the second output $142_2$ of the phase shifter 140 does not pass through the wiper 140w, the sub-component of an RF signal that is input to the phase shifter 140 that passes to the second output $142_2$ will experience a fixed phase change (where the magnitude of the phase change is based on the length of the transmission path, the dielectric constant of the transmission medium and the frequency of the RF signal). In contrast, the phase changes experienced by the two sub-components of an input RF signal that pass to the respective first and third outputs $142_1$, $142_3$ will experience variable phase changes, as the length of the transmission paths for these sub-components varies based on the position of the wiper 140w. In particular, when the wiper 140w is rotated to the left, the length of the transmission path (and hence the amount of phase change) to one of the first and third outputs $142_1$, $142_3$ will increase, while the length of the transmission path (and hence the amount of phase change) to the other of the first and third outputs $142_1$, $142_3$ will decrease. Thus, by rotating the wiper 140w it is possible to impart a phase progression to the three sub-components of an RF signal that are passed to three respective pairs of radiating elements 40, since rotating the wiper increases the phase shift applied to the sub-component of an RF signal that is passed to a first of the outputs 142, does not change the phase shift applied to the sub-component of an RF signal that is passed to a second of the outputs 142, and decreases the phase shift applied to the sub-component of an RF signal that is passed to a third of the outputs 142, As is well understood in the art, this phase progression acts to electronically change the downtilt angle of the antenna beams generated by RF signals transmitted through the phase shifter 140.

The radiating elements 40 can be provided as an array of radiating elements aligned in columns and rows. The array of radiating elements can be provided as a mMIMO array 40m of radiating elements 40. As shown, there are eight columns and twelve rows of radiating elements 40 but other configurations may be used.

Figure 1:
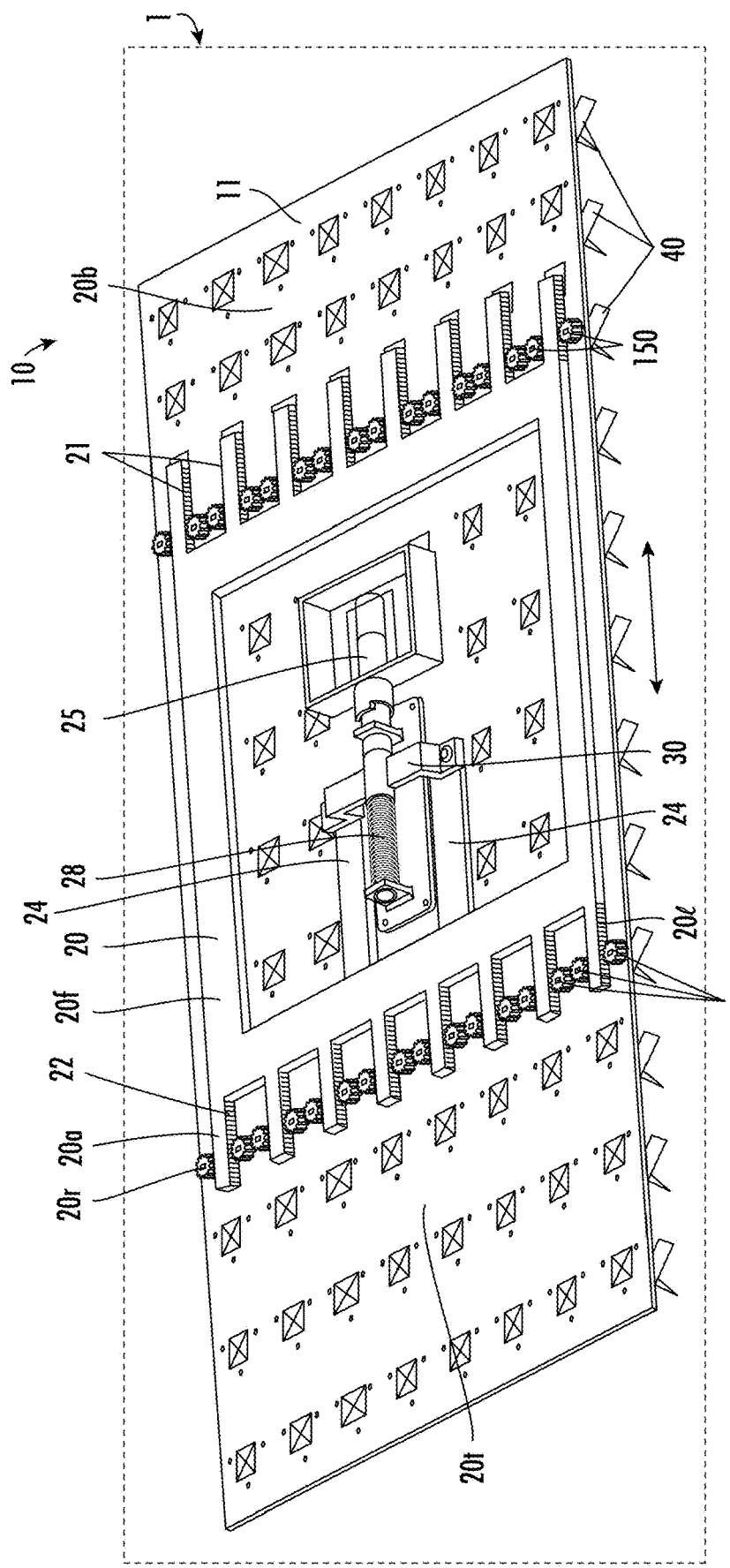
FIG. 1 is a rear, side perspective view of a RET assembly with an RET gear system according to embodiments of the present invention.
Figure 8:
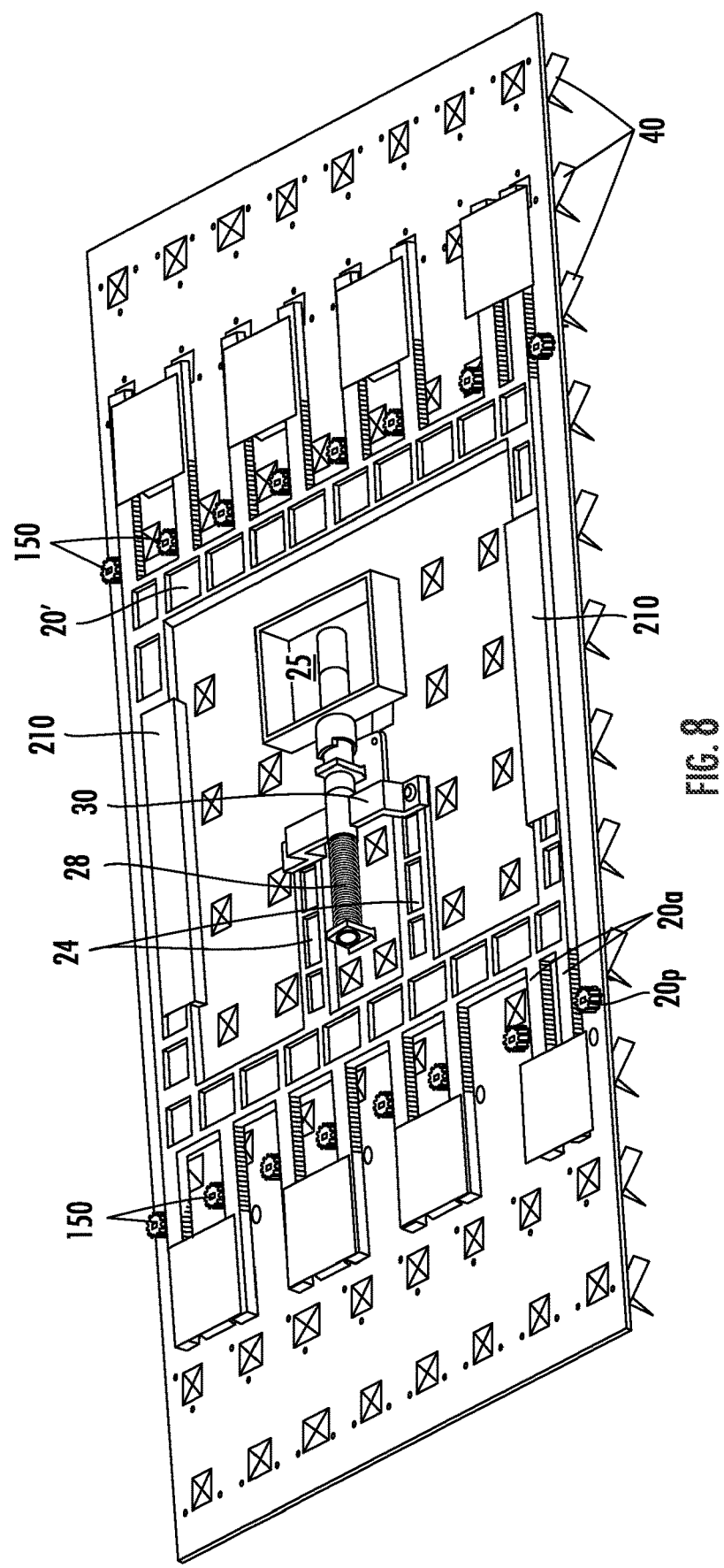
FIG. 8 is a rear, side perspective view of yet another embodiment of an RET assembly according to embodiments of the present invention.

Referring to FIGS. 1, 3, 5 and 6, the RET gear system 15 comprises a large gear plate 20, a motor 25, a lead screw 28 and a nut 30 coupled to the lead screw 28. The gear plate 20 provides a plurality of spaced apart (linear) gear tracks 21 that extend in a longitudinal direction. The gear plate 20 can have a plurality of laterally spaced apart arms 20a that extend in a longitudinal direction, with neighboring arms separated by an open space 20s. The gear tracks 21 are arranged to provide gear teeth on at least one of the edges of the arms 20a. At least one gear 150 can reside in the open space 20s. There can be two gears 150 inside at least some of the open spaces 20s as shown in FIG. 1 and there can be a single gear inside at least some of the open spaces 20s as shown in FIG. 8. Other arrangements are possible.

At least one longitudinally extending side edge 20e of one or more of the arms 20a can be configured with gear teeth 22. As indicated by the arrows in FIG. 5, the gear plate 20 translates up and down in response to movement of the lead screw 28 thereby moving the arms 20a which concurrently rotate gears 150 coupled thereto, which in turn, rotates the wipers 140w.

Figure 7:
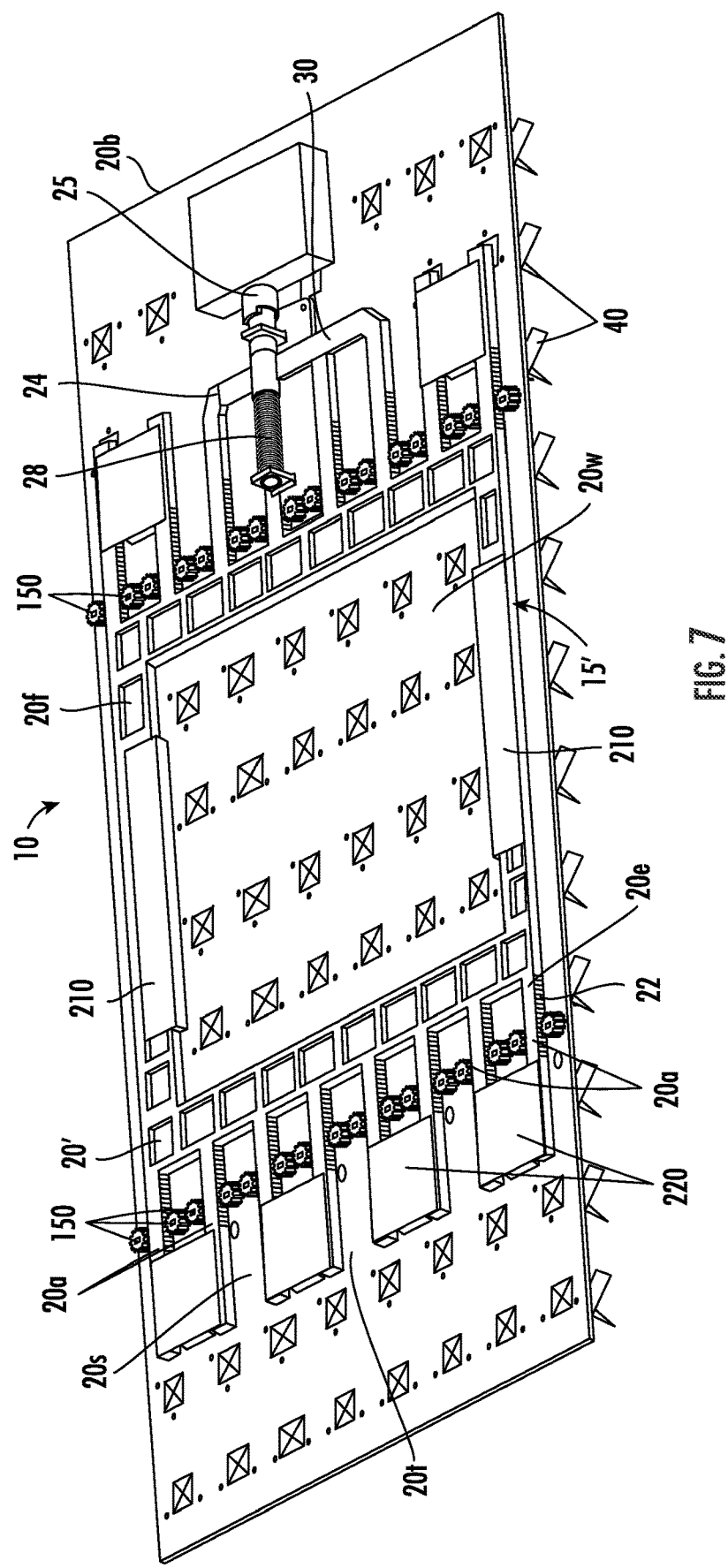
FIG. 7 is a rear, side perspective view of another embodiment of an RET assembly according to embodiments of the present invention.

The gear plate 20 can have a window 20w surrounded by a frame body 20f that merges into upwardly and downwardly extending arms 20a that extend away from the frame body 20f. The motor 25, lead screw 28 and nut 30 can reside inside the window 20w, in some embodiments. In other embodiments, the motor 25 can reside outside the gear plate 20', such as to the side or above or below the gear plate 25. FIG. 7 illustrates the motor 25 below the gear plate 20'. The nut 30 can be attached to attachment segments 24 of the gear plate 20 in order to transfer linear movement of the nut to linear movement of the gear plate 20.

One or more of the arms 20a of the gear plate 20 can have a pair of longitudinally extending side edges 20e with gear teeth 22 and both side edges 20e can engage an adjacent gear 150. In some embodiments, two gears 150 can reside between neighboring arms 20a. In some embodiments, one gear 150 can reside outside each of the leftmost side 20l and rightmost side 20r arms 20a.

The gear plate 20 can be formed of a dielectric material in some embodiments.

The gears 150 and the wipers 140 can also be formed of a dielectric material that is the same or different from that of the gear plate 20.

Figure 6:
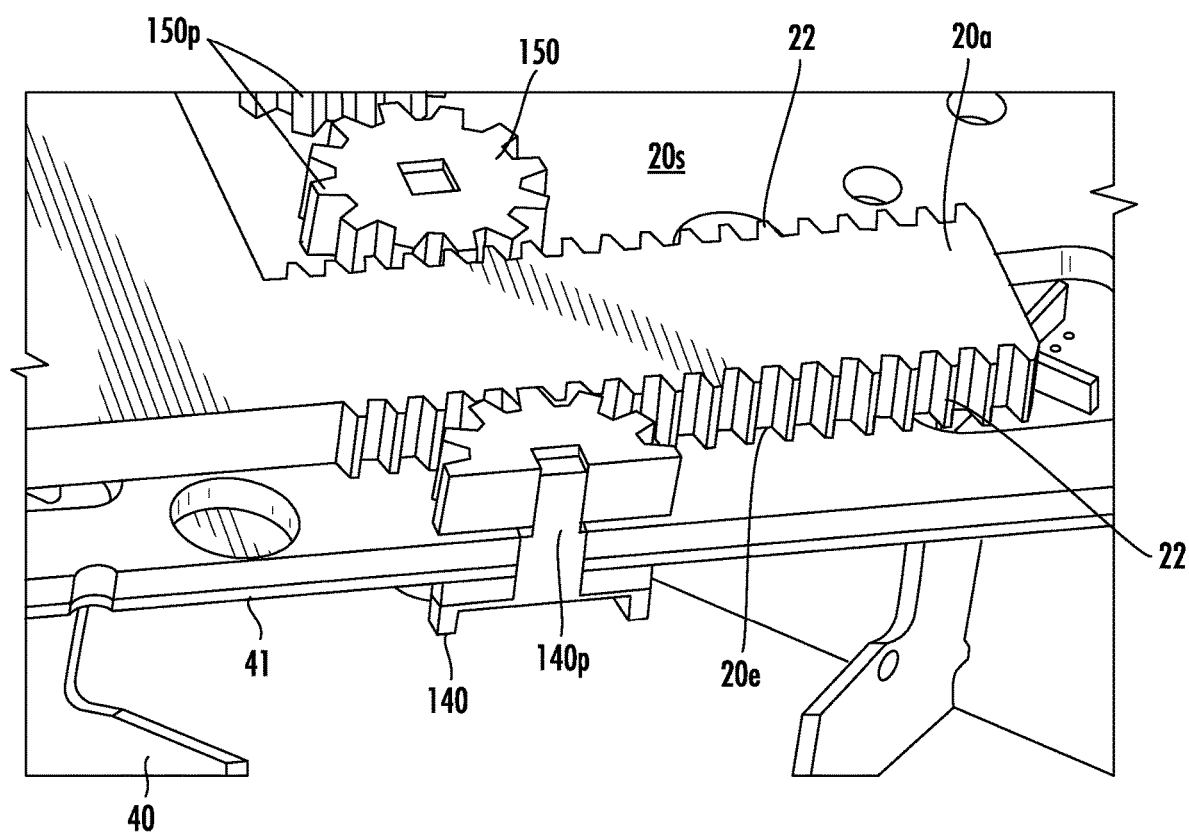
FIG. 6 is a greatly enlarged, partial section view of a portion of the RET assembly shown in FIG. 1 according to embodiments of the present invention.

As best shown in FIG. 6, a pair 150p of neighboring gears 150 inside a respective open space 20s between adjacent arms 20a can be configured so that their gear teeth 150g engage/mesh with each other as well as the adjacent gear teeth 22 on a respective arm 20a. In other embodiments, the two gears 150 inside each respective open space 20s may be spaced apart from each other so that the gear teeth of the two gears 150 do not engage each other and instead only engage the gear teeth 22 on the respective arms 20a.

Figure 5:
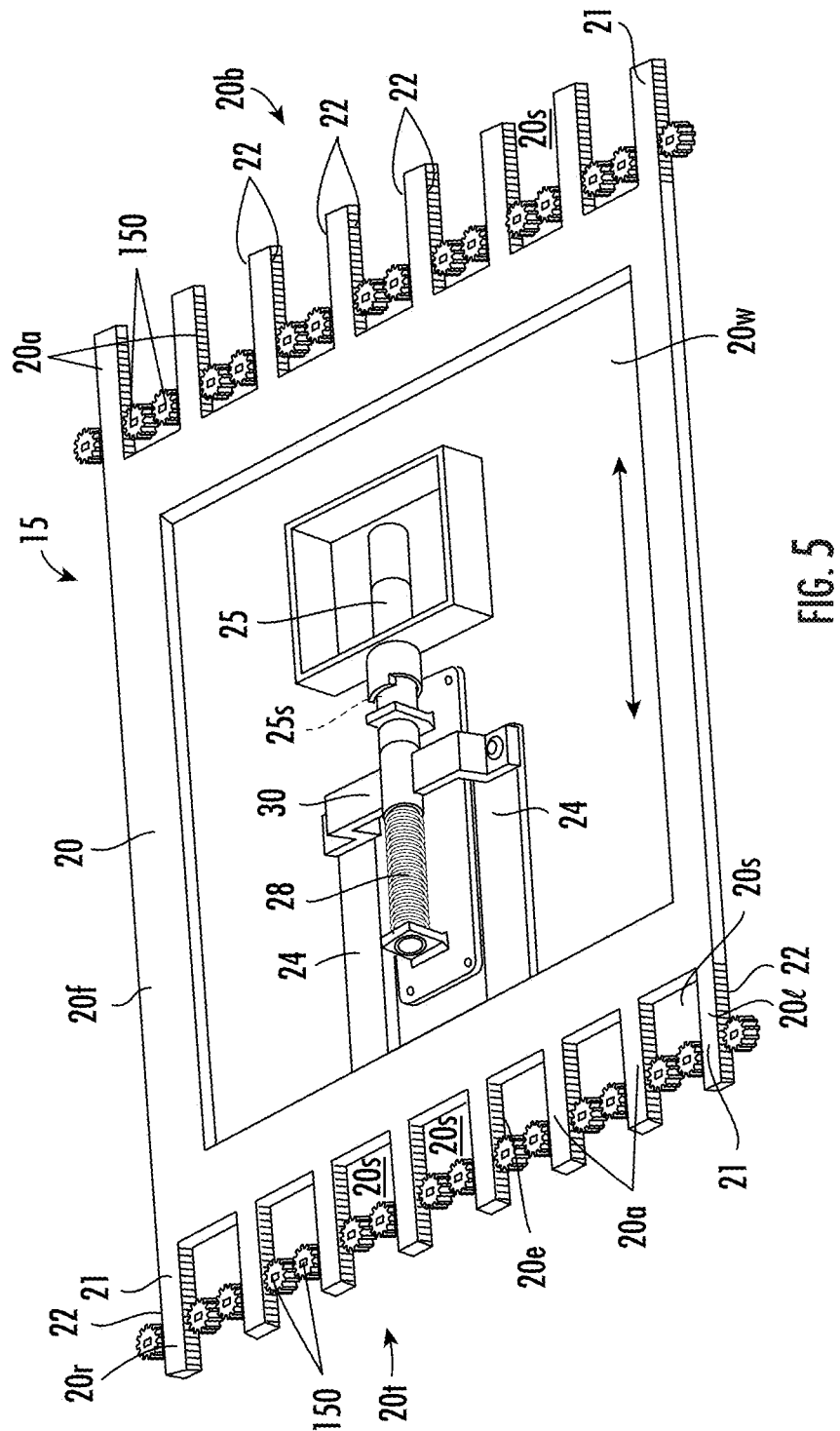
FIG. 5 is a rear, side perspective view of the RET gear system shown in FIG. 1 according to embodiments of the present invention.

As shown in FIG. 5, in an example embodiment, the RET gear system 15 can be configured so that one motor 25 with its drive shaft 25s provides rotational output to translate the lead screw 28 and move the gear plate 20 to concurrently rotate 32 gears 150. FIG. 8 illustrates that the RET gear system 15 can be configured so that one motor 25 provides rotational output to translate the lead screw 28 and move the gear plate 20 to concurrently rotate 16 gears 150.

In some embodiments, the gear plate 20 and one gear 150 of the plurality of gears 150 can be configured to drive both phases of different wipers 140w. This may be accomplished, for example, by providing engaged gear teeth on the outer edges of the two wipers 140w of two phase shifters 140 on each feed board 41f. Each gear 150 may be connected to a first of the two wipers 140w so that rotation of the gear 150 causes rotation of the first of the wipers 140w. The meshed gear teeth on the two wipers 140w ensures that rotation of the first of the wipers 140w causes rotation of the second of the wipers 140w.

Figure 2B:
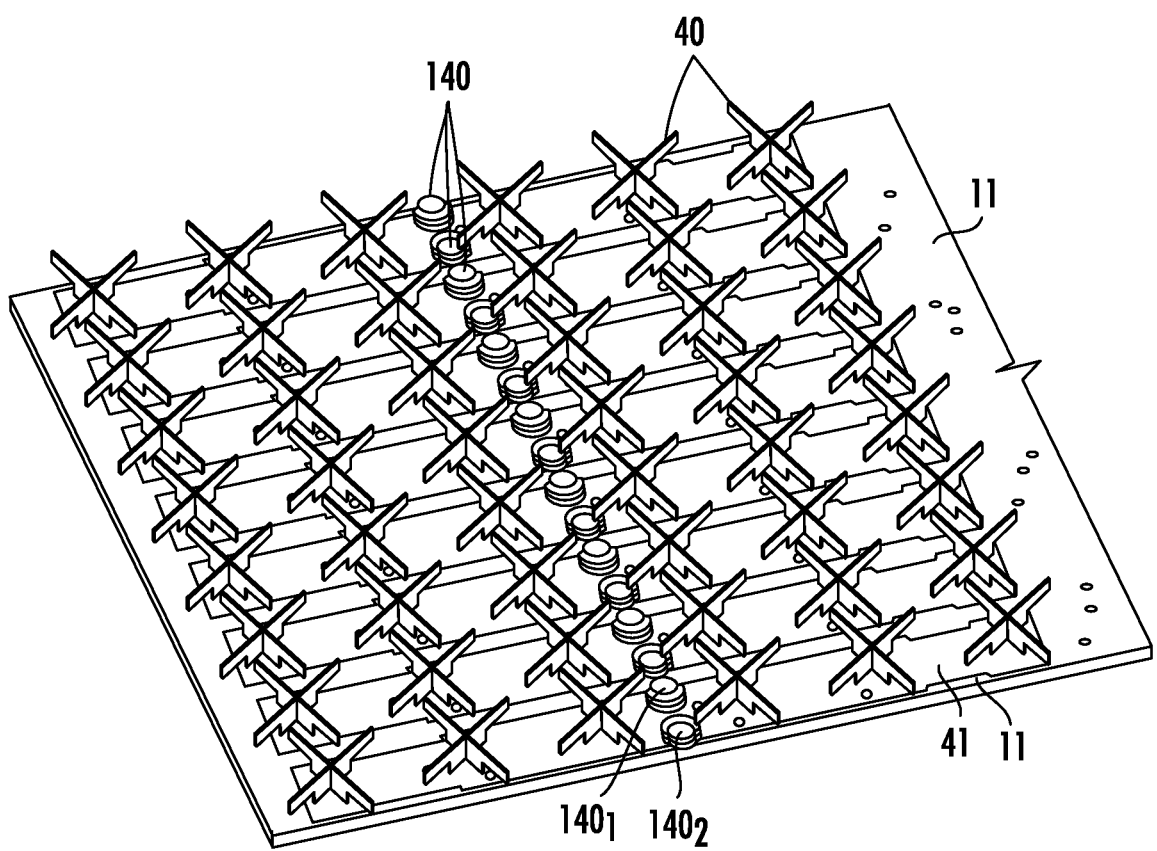
FIG. 2A is a front, side perspective view of the RET assembly shown in FIG. 1.
Figure 3:
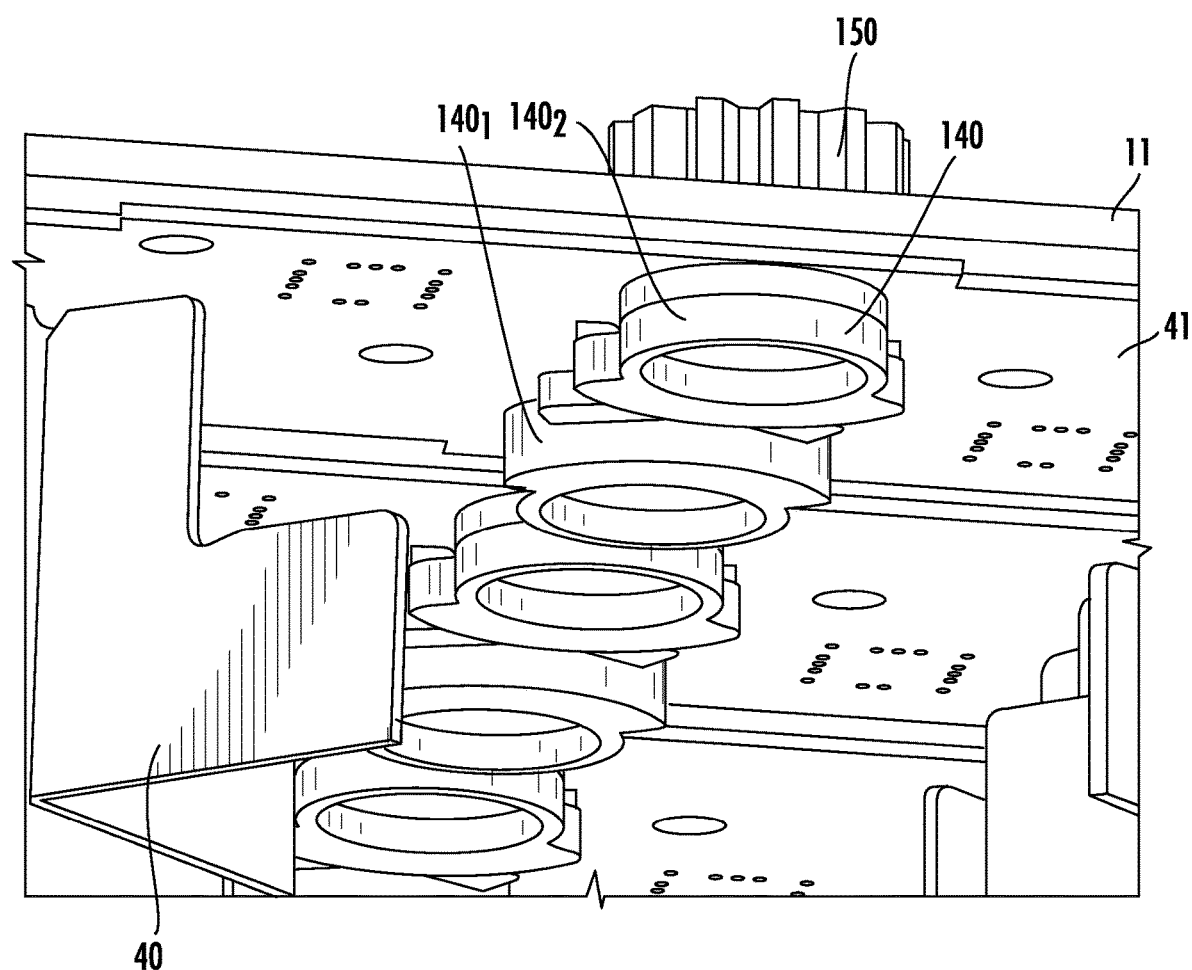
FIG. 3 is a greatly enlarged front, side perspective, partial view of a portion of the RET assembly shown in FIG. 2B according to embodiments of the invention.
Figure 9:
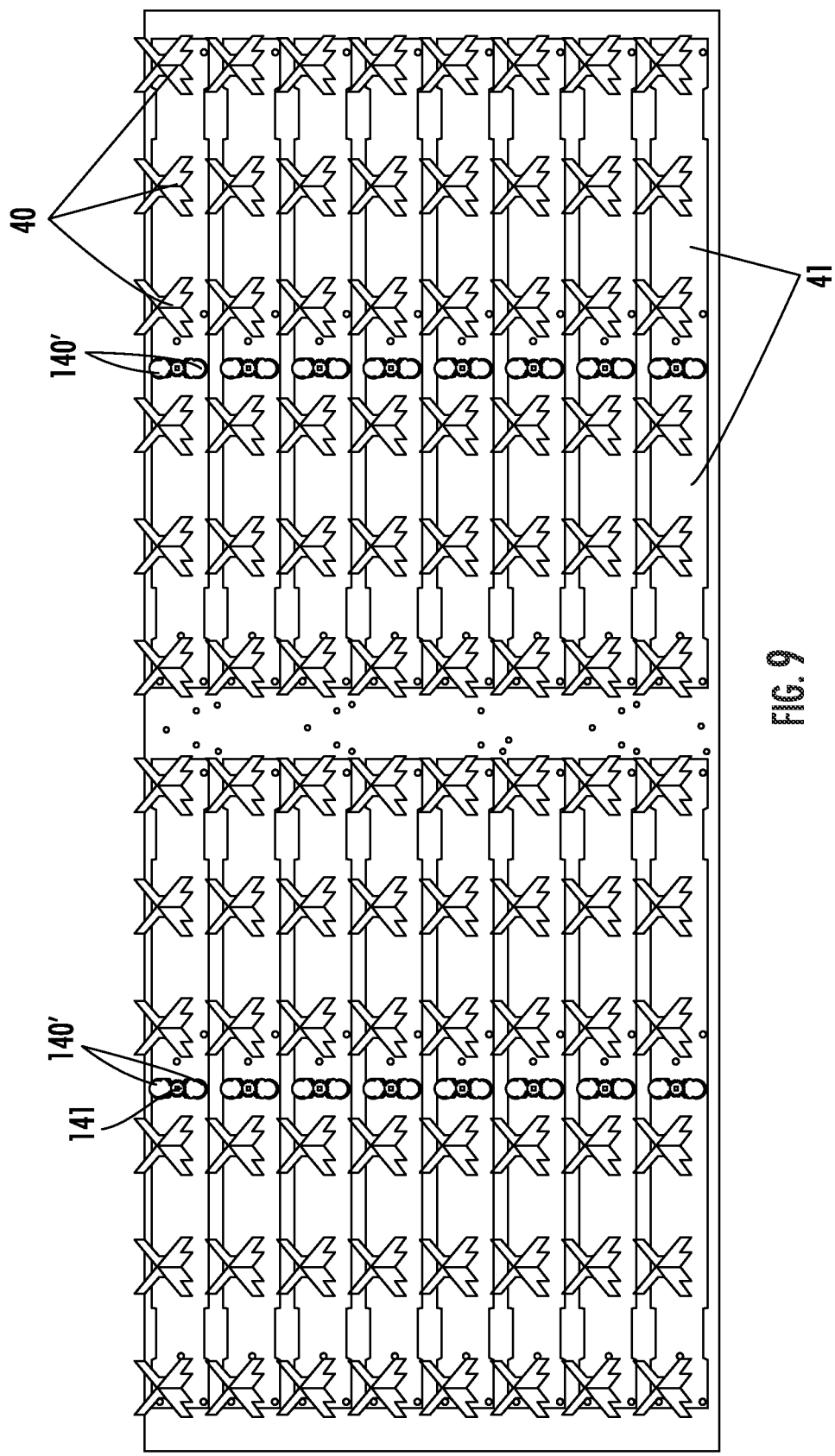
FIG. 9 is a front, side perspective view of the RET assembly shown in FIG. 8.

The radiating elements 40 can be dual-polarized and there can be two phase shifters 140 per feed board 41f. As shown in FIGS. 2A, 2B and 9, there are two vertically stacked sets of eight columns 40c of six radiating elements 40 to provide sixteen columns without making the width of the antenna unduly large. There can be a longitudinally extending gap space 40g between longitudinally stacked pairs of columns 40c.

As shown in FIG. 5, there can be eight arms 20a on the top 20t and eight arms 20a on the bottom 20b of the gear plate 20. The arms 20a at the top 20t of the gear plate 20 can be parallel to each other and regularly spaced apart. The arms 20a at the bottom 20b of the gear plate 20 can be parallel to each other and regularly spaced apart. The number of arms 20a can vary depending on the number of gears 150 and wipers 140 that are to be driven but are typically provided in a range of 2-32 on each of the top 20t and bottom 20b of the gear plate 20.

The gear plate 20 can be provided as a single monolithic member or may be provided by more than one cooperating member.

Also, while it is preferred that a single motor 25 be used to drive the gear plate 20, two (or more) motors 25 may be used to drive two gear plates 20 (not shown).

FIG. 8 illustrates that some arms 20a (shown as two of eight at the top 20t of the gear plate 20' and two of eight at the bottom 20b of the gear plate 20') may be closer together than others. For the pair 20p of arms 20a that are closer together, one gear 150 can engage gear teeth 22 on a right side of one arm or the pair of arms and another gear 150 can engage gear teeth 22 on a left side of the other arm of the pair of arms. This can reduce the width of the gear plate 20'.

Referring to FIG. 6, each gear 150 can be coupled to at least one phase shifter 140. In the embodiment shown in FIGS. 1-6, one gear 150 is coupled to a corresponding one wiper 140w. The phase shifter 140 can have a post 140p that is attached to the gear 150 so that the gear 150 rotates the wiper 140w which, in turn, imparts a phase progression to the sub-components of the RF signal that are passed through the phase shifter 140 that includes the wiper 140w, thereby effecting an electronic downtilt to the antenna beam generated by the radiating elements on the feed board 41p that includes the phase shifter 140. The post 140p can alternatively be integrated into the gear 150 and project forward from the gear 150 to couple the gear 150 to the phase shifter 140 behind the feed board 41f (not shown).

Figure 10:
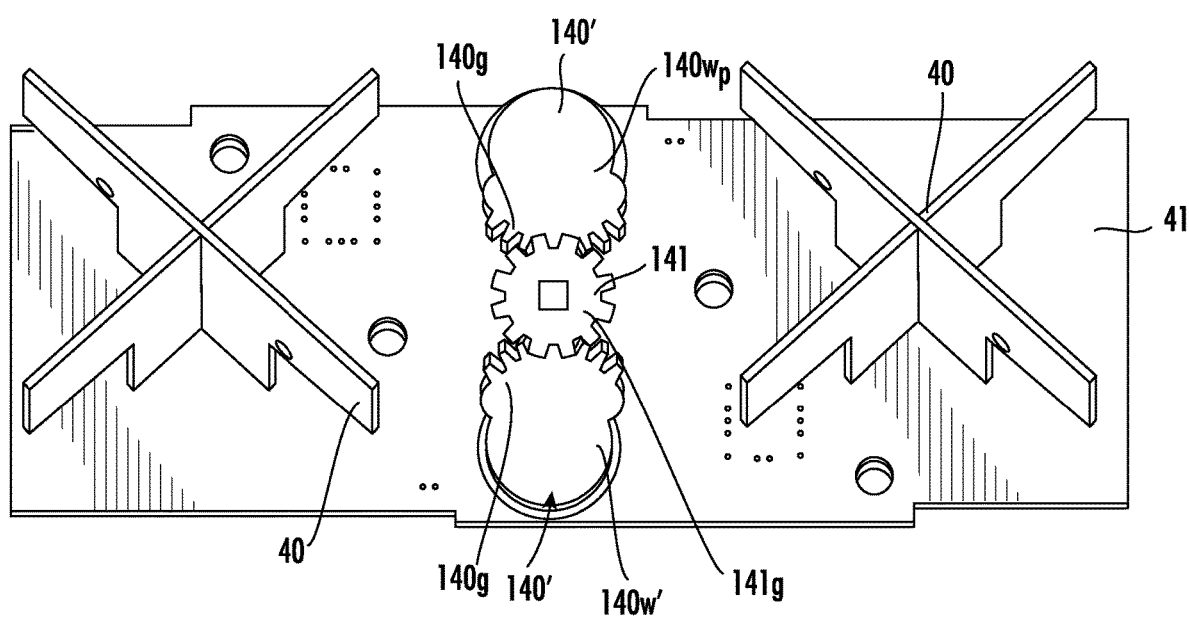
FIG. 10 is a greatly enlarged, front, side perspective view of a portion of the RET assembly shown in FIG. 9.

In the embodiment shown in FIGS. 8-10, one gear 150 can be configured to rotate a pair of phase shifters 140' via a driver gear 141. That is, one gear 150 is indirectly coupled to the pair of phase shifters 140' and is directly coupled to the driver gear 141. A pair 140$w_p$ of wipers 140$w$' can have an arcuate sub-segment of gear teeth 140$g$ that engage gear teeth 141$g$ of the driver gear 141. In this embodiment, a single gear 150 can engage each arm 20$a$ to engage gear teeth 22 provided along a single longitudinally extending side edge 20$e$ of each arm 20$a$.

As mentioned above, in yet another embodiment the driver gear 141 can be omitted and the one gear 150 can drive one of the pair of wipers 140$w$ on the feed board 41$f$. In such an embodiment, the wipers can be designed so that the gear teeth 140$g$ on the two wipers 140$w$ are engaged, such that rotation of the first wiper drives rotation of the second wiper.

Figure 11:
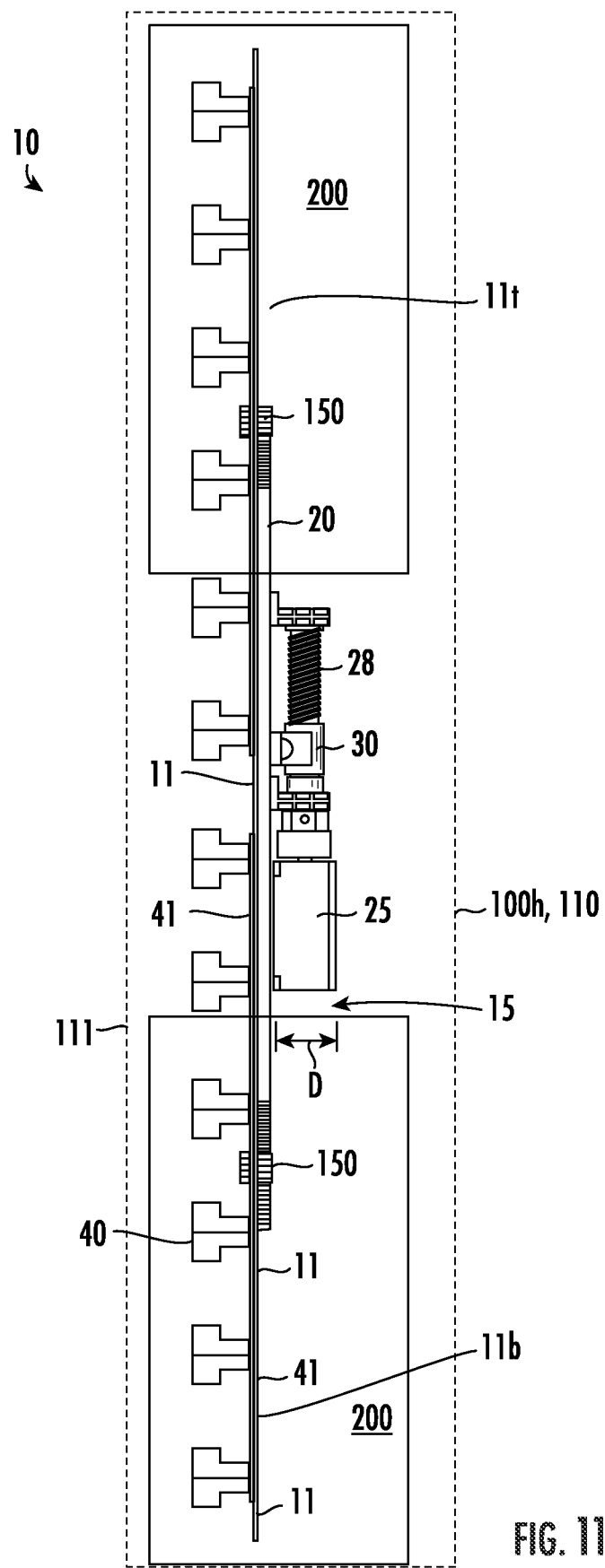
FIG. 11 is a side view of the RET assembly shown in FIG. 1.
Figure 12A:
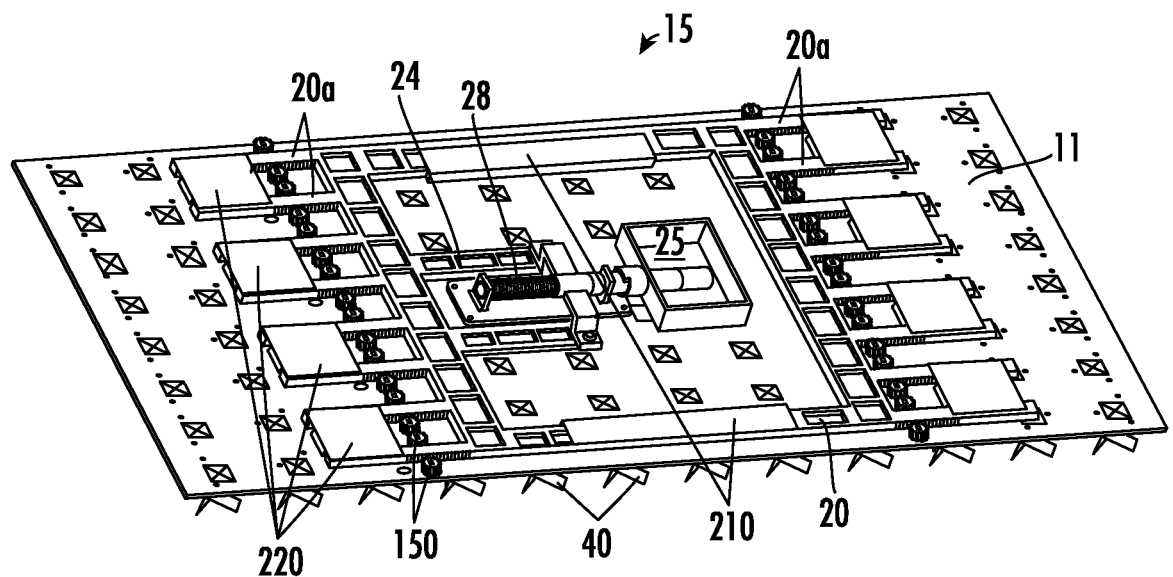
FIG. 12A is a rear, side perspective view of yet another embodiment of the RET assembly according to the present invention.
Figure 12B:
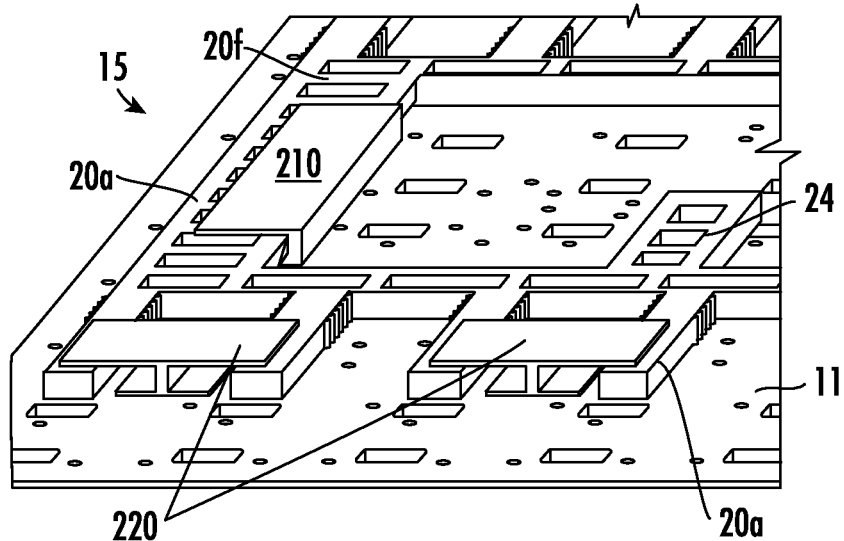
FIG. 12B is a greatly enlarged corner portion of the RET assembly shown in FIG. 12A.

FIG. 11 illustrates that the RET assembly 10 can be a relatively compact assembly and, in particular, can be quite thin in the depth direction of the base station antenna. The RET gear system 15 can be configured to project outward a maximal distance D in the depth direction, where D is in a range of 5-20 mm, such as about 8 mm in some embodiments. In addition, the RET gear system 15 can be configured to only extend the distance D behind a center portion of the reflector 11, thereby leaving vacant spaces 200 behind the reflector 11 at both a top portion 11$t$ and bottom portion 11$b$ of the reflector 11. These vacant spaces 200 can be used for other components such as calibration boards, filters and the like.

The gear plate 20 can have a rectangular shape with a pair of long sides and a pair of short sides. However, other shapes may be used. In operative position (FIG. 15) in or adjacent a housing 100$h$ of a base station antenna and/or inside an active antenna module 110, the long sides can extend longitudinally, and the short sides can extend laterally.

Turning now to FIGS. 7, 8, 12A, 12B and 13, the RET gear assembly 15, 15' can also include guide members 210, 220 to facilitate linear translation. The guide members 210, 220 can include open channels that slidably receive segments of the gear plate 20 therein. In other embodiments, the gear plate 20 can provide the channels and the guide members 210, 220 can have segments that extend therein (not shown). The top and bottom guide members 210 can be provided as separate members or may be joined and shaped as a single member (not shown).

Figure 13:
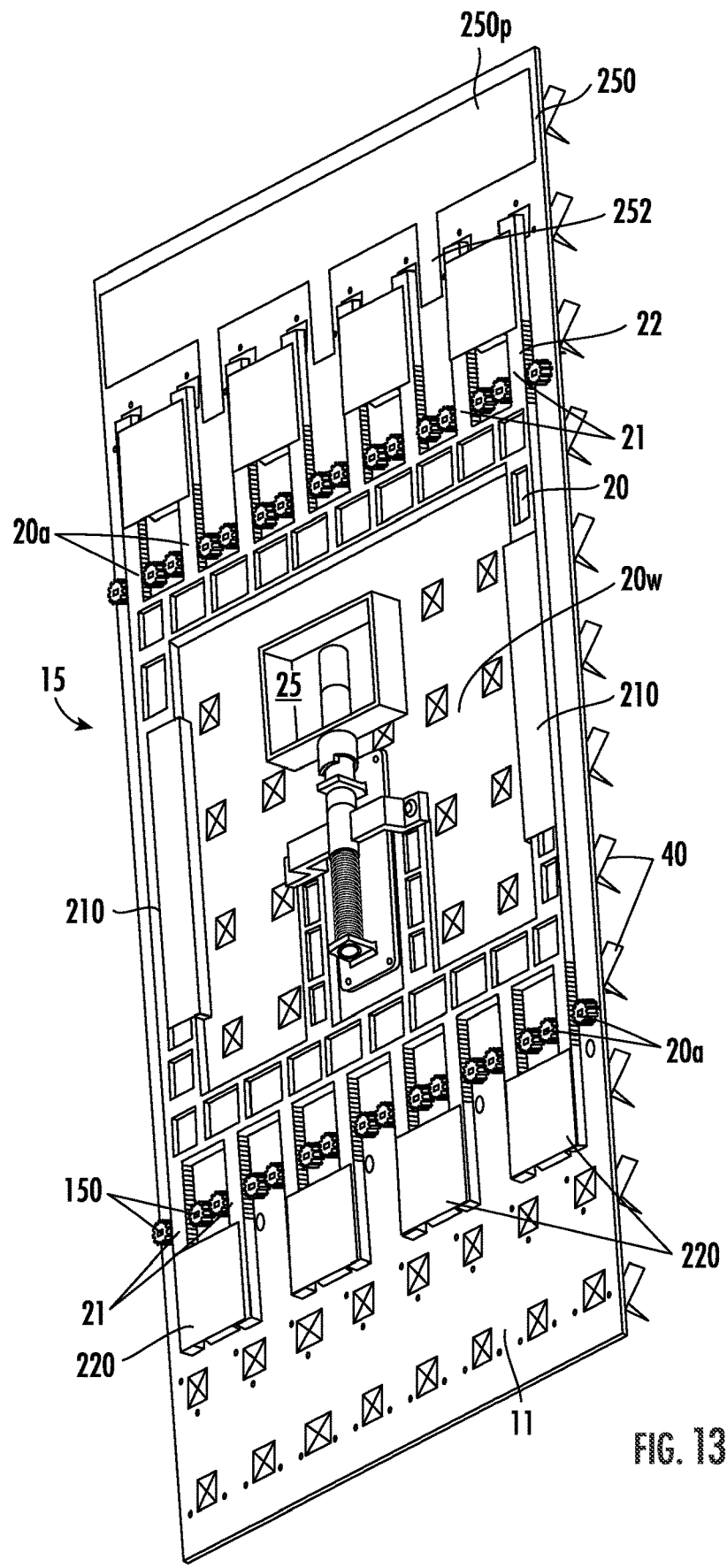
FIG. 13 is a rear, side perspective view of the RET assembly shown in FIG. 1 also schematically illustrating a custom configuration of a calibration board according to embodiments of the present invention.

As shown in FIG. 13, the RET assembly 10 can also include a calibration board 250. The calibration board 250 can have a plurality of fingers 252 that extend downward (or upward) from a primary segment 250$p$. The fingers 252 can extend into open spaces 20$s$ between the arms 20$a$ of the gear plate 20.

Referring to FIG. 14, the RET assembly 10 with the RET gear system 15, 15' comprising the gear plate 20 can be provided in an active antenna unit or module 110. In particular, active antenna modules often include an active antenna module reflector 11$a$ with a multi-column array of radiating elements 40$a$ mounted thereon. The active antenna unit 110 has a radome 110$r$ and a radio 50 in addition to the RET gear system 15, the reflector 11$a$ and the multi-column array of radiating elements 40$a$.

In this embodiment, the active antenna module reflector 11$a$ can have a reflector body 11$b$. The reflector body 11$b$ can have a frame configuration whereby the front perimeter has cut outs and/or apertures 28 that have a lateral extent La that is in a range of 20-99% of a lateral extent La of the reflector body 11$b$. At least some of the plurality of apertures 28 can also have a longitudinal extent Lo that is in a range of 10-90% of a longitudinal extent Lo of the reflector body 11$b$.

The reflector body 11$b$ can also comprise one or more bridges 128 that laterally extend between adjacent/neighboring apertures 28.

The apertures 28 can reside in front of one or more cavity filters 60 and behind the array of radiating elements 40$a$. The cavity filters 60 can have front surfaces that cooperate with the reflector body 11$b$ to provide reflective surfaces to provide a reflector function. The cavity filters 60 can be resonant cavity filters as is well known to those of skill in the art. The radio 50 can have a metal cover 50$c$.

The cavity filters 60 can cooperate with the radio cover 50$c$, and the reflector body 11$b$ to define a reflector for the radiating elements 40$a$ thus eliminating the need for a separate reflector in front of the cavity filters 60 as in conventional active antenna units. In other embodiments, the active antenna module reflector 11$a$ may comprise a conventional reflector that does not include the apertures 28.

Figure 15:
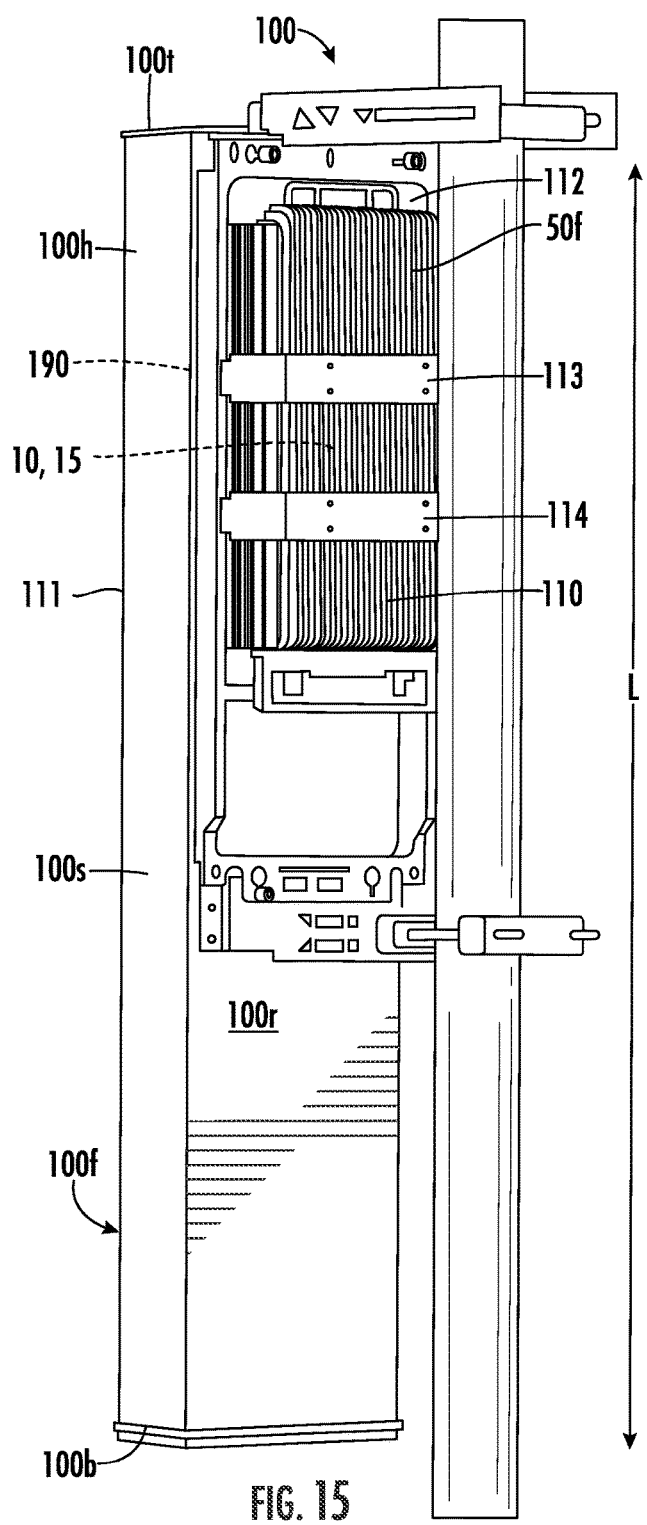
FIG. 15 is a rear perspective view of a base station antenna comprising an active antenna unit with the reflector assembly held at least partially external to the passive housing according to embodiments of the present invention.

Referring to FIG. 15, a base station antenna 100 according to some embodiments is shown. The base station antenna 100 includes a passive antenna assembly 190 with a plurality of internal linear arrays 111 of radiating elements arranged in a plurality of laterally spaced apart and adjacent longitudinally extending columns between a top 100$t$ and a bottom 100$b$ of the base station antenna 100. In an example embodiment, there can be eight columns of linear arrays 111 of radiating elements.

An active antenna unit 110 can be held against a rear 100$r$ of a housing 100$h$ of the base station antenna 100 comprising the passive antenna assembly with a bracket assembly 112 having first and second laterally extending spaced apart brackets 113, 114. The housing 100$h$ has a front surface 100$f$ defining a radome and sides 100$s$ and a rear 100$r$. The bracket assembly 112 can also mount the base station antenna housing 100$h$ with the active antenna unit 110 to a target structure such as a pole.

Figure 16:
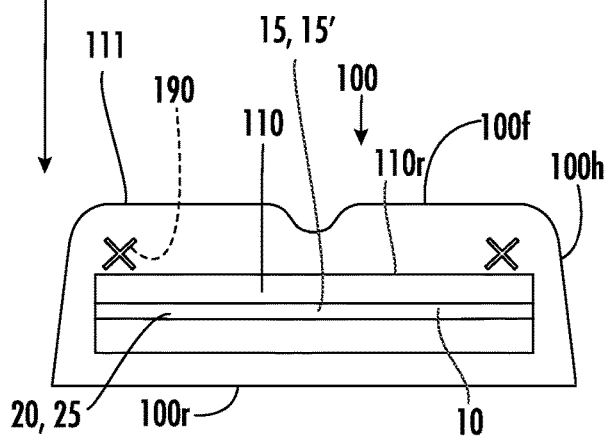
FIG. 16 is a simplified lateral cross-section view of a base station antenna with the active antenna unit with the reflector assembly held inside the base station antenna according to embodiments of the present invention.

FIG. 16 illustrates another embodiment of a base station antenna 100 with a housing 100$h$ comprising a passive antenna assembly 190 sized and configured to hold the active antenna unit 110 at least partially internally thereof. In some embodiments, the RET gear assembly 15, 15' can be held at least partially inside the base station antenna housing 100$h$ without requiring any or all the components of the active antenna unit 110.

The base station antenna 100 can include one or more arrays of low-band radiating elements, one or more arrays of mid-band radiating elements, and one or more arrays of high-band radiating elements. The radiating elements may each be dual-polarized radiating elements. Further details of radiating elements can be found in co-pending WO 2019/236203 and WO 2020/072880, the contents of which are hereby incorporated by reference as if recited in full herein. For further details regarding example active antenna modules and base station antenna housings with passive antenna assemblies, see, co-pending U.S. patent application Ser. No. 17/209,562 and corresponding PCT Patent Application Serial Number PCT/US2021/023617, the contents of which are hereby incorporated by reference as if recited in full herein.

The linear arrays (of the active antenna unit 110) and/or 111 of the passive antenna assembly 190, can be provided as low, mid or high band radiating element. The high-band radiating elements may be configured to transmit and receive signals in the 3.3-4.2 GHz frequency band or a portion thereof and/or in the 5.1-5.8 GHz frequency band or a portion thereof. The mid-band radiating elements may be configured to transmit and receive signals in, for example, the 1.427-2.690 GHz frequency band or a portion thereof. The low-band radiating elements may be configured to transmit and receive signals in, for example, the 0.616-0.960 GHz frequency band or a portion thereof.

Figure 17:
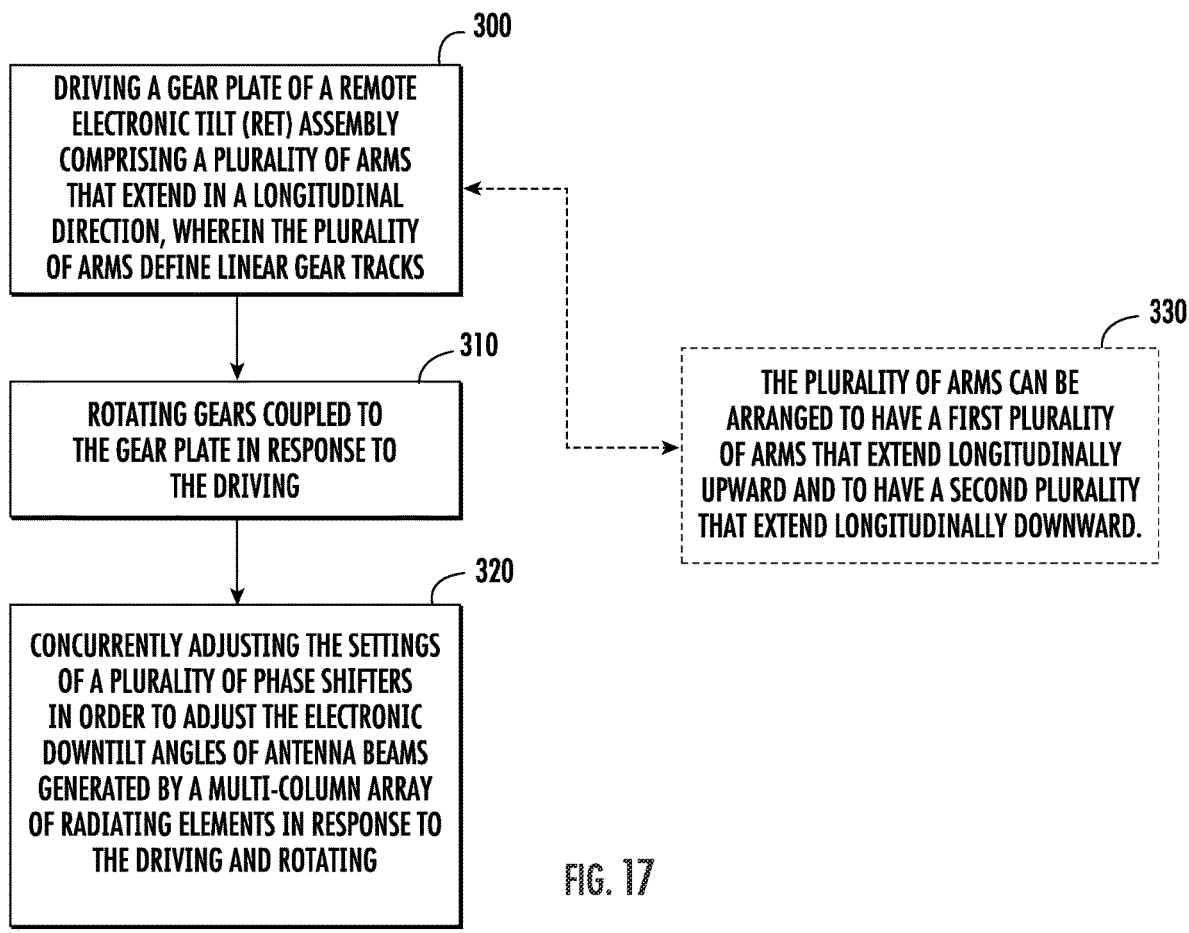
FIG. 17 is a flow chart of a method of operating phase shifters of an antenna according to embodiments of the present invention.

FIG. 17 is a flow chart of example actions that can be used to adjust the amount of electronic downtilt applied to the antenna beams generated by the multi-column array of radiating elements. The methods can include driving a gear plate of a remote electronic tilt (RET) assembly comprising a plurality of arms that extend in a longitudinal direction. The plurality of arms define linear gear tracks (block 300).

The method also includes rotating gears coupled to the gear plate in response to the driving (block 310) and concurrently adjusting the settings of a plurality of phase shifters in order to adjust the electronic downtilt angles of a plurality of antenna beams generated by a multi-column array of radiating elements in response to the driving and rotating (block 320).

The rotating can be carried out so that all the gears rotate in synchronization. The plurality of arms can be arranged to have a first plurality of arms that extend longitudinally and to have a second plurality that extend longitudinally downward (block 330).

It will be appreciated that other types of radiating elements may be used, that more or fewer linear arrays may be included in the antenna, that the number of radiating elements per array may be varied, and that planar arrays or staggered linear arrays may be used instead of the "straight" linear arrays illustrated in the figures in other embodiments.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

In the discussion above, reference is made to the linear arrays of radiating elements that are commonly included in base station antennas. It will be appreciated that herein the term "linear array" is used broadly to encompass both arrays of radiating elements that include a single column of radiating elements that are configured to transmit the sub-components of an RF signal as well as to two-dimensional arrays of radiating elements (i.e., multiple linear arrays) that are configured to transmit the sub-components of an RF signal. It will also be appreciated that in some cases the radiating elements may not be disposed along a single line. For example, in some cases a linear array of radiating elements may include one or more radiating elements that are offset from a line along which the remainder of the radiating elements are aligned. This "staggering" of the radiating elements may be done to design the array to have a desired azimuth beamwidth. Such staggered arrays of radiating elements that are configured to transmit the sub-components of an RF signal are encompassed by the term "linear array" as used herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The term "about" with respect to a number, means that the stated number can vary by +/−20%.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A remote electronic tilt (RET) assembly, comprising:
a gear plate comprising a plurality of arms that extend in a longitudinal direction and that are laterally spaced apart, wherein at least some of the plurality of arms define linear gear tracks comprising gear teeth;
a plurality of gears, each of the plurality of gears rotatably coupled to one or two of the linear gear tracks;
a motor coupled to a lead screw that is coupled to the gear plate, wherein the motor and lead screw are configured to drive the gear plate upwardly and downwardly;
a plurality of phase shifters, each phase shifter including a respective wiper that is located in front of the gear plate, wherein each gear is coupled to one or more of the plurality of phase shifters; and
a plurality of radiating elements in front of the gear plate and coupled to the phase shifters, whereby downtilt angles of antenna beams generated by respective subsets of the radiating elements are changed in response to translation of the gear plate.

2. The RET assembly of claim 1, wherein the gear plate is a single monolithic member and is formed of a dielectric material.

3. The RET assembly of claim 2, wherein the gear plate is planar.

4. The RET assembly of claim 1, further comprising a reflector between the radiating elements and the gear plate.

5. The RET assembly of claim 4, further comprising a calibration board residing above or below the gear plate, parallel to and/or co-planar with the reflector.

6. The RET assembly of claim 1, further comprising a plurality of printed circuit boards, wherein two of the phase shifters are implemented in each of the printed circuit boards, and wherein the radiating elements project forwardly from the printed circuit boards.

7. The RET assembly of claim 6, wherein each phase shifter includes a respective wiper printed circuit board.

8. The RET assembly of claim 6, wherein the plurality of printed circuit boards are arranged in a plurality of columns and rows.

9. The RET assembly of claim 1, wherein the gear plate is configured with a frame portion, and wherein the plurality of arms are arranged to have a first plurality of arms that extend longitudinally upward from the frame portion of the gear plate and to have a second plurality of arms that extend longitudinally downward from the frame portion.

10. The RET assembly of claim 9, wherein the motor is arranged to reside outside the frame portion.

11. The RET assembly of claim 9, wherein the motor is arranged to reside within an opening in the frame portion.

12. The RET assembly of claim 1, wherein the plurality of radiating elements are provided in rows and columns, wherein the plurality of arms are provided as sixteen arms, wherein the plurality of gears is either sixteen or thirty two, and wherein the gear plate and the plurality of gears are configured to adjust settings of the plurality of phase shifters in synchronization.

13. The RET assembly of claim 12, wherein the columns comprise eight columns stacked above an aligned second set of another eight columns to define sixteen columns of radiating elements.

14. The RET assembly of claim 1, wherein a first one of the plurality of arms is configured with first and second laterally spaced apart linear gear tracks to define some of the gear tracks, and wherein a first one of the plurality of gears is coupled to the first linear gear track and a second one of the plurality of gears is coupled to the second linear gear track.

15. The RET assembly of claim 1, wherein the plurality of wipers are arranged in two longitudinally spaced apart rows.

16. The RET assembly of claim 1, further comprising a plurality guide members that are laterally and longitudinally spaced apart and arranged behind the radiating elements and configured to slidably cooperate with the gear plate to provide alignment during translation, wherein the guide members are formed of dielectric material.

17. The RET assembly of claim 1, wherein a single gear of the plurality of gears is coupled to a corresponding single arm of the plurality of arms.

18. The RET assembly of claim 17, wherein the single gear is coupled to a rotatable driver gear that is configured to engage gear teeth of a pair of adjacently positioned wipers positioned in front of printed circuit boards.

\* \* \* \* \*